(12) United States Patent
Malik et al.

(10) Patent No.: US 10,579,816 B2
(45) Date of Patent: \*Mar. 3, 2020

(54) USE CASE DRIVEN GRANULAR APPLICATION AND BROWSER DATA LOSS PREVENTION CONTROLS

(71) Applicant: International Business Machines Corporation, Armonk, NY (US)

(72) Inventors: Jatin Malik, Bangalore (IN); Joshua Lambert, Eagleville, PA (US); Sumeet Singh, Bangalore (IN); Srungarakavi Venkat Samba Naresh, Visakhapatnam (IN)

(73) Assignee: International Business Machines Corporation, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/212,226

(22) Filed: Dec. 6, 2018

(65) Prior Publication Data

US 2019/0108359 A1  Apr. 11, 2019

Related U.S. Application Data

(63) Continuation of application No. 14/808,671, filed on Jul. 24, 2015, now Pat. No. 10,181,048.

(60) Provisional application No. 62/028,864, filed on Jul. 25, 2014.

(51) Int. Cl.
*G06F 21/62* (2013.01)

(52) U.S. Cl.
CPC .. *G06F 21/6218* (2013.01); *G06F 2221/2141* (2013.01)

(58) Field of Classification Search
CPC .................. G06F 21/6218; G06F 2221/1241
USPC ........................................................... 726/1
See application file for complete search history.

(56) References Cited

U.S. PATENT DOCUMENTS

| 8,613,002 | B2 | 12/2013 | Narayanan | |
|---|---|---|---|---|
| 8,869,235 | B2* | 10/2014 | Qureshi | G06F 8/53 |
| | | | | 726/1 |
| 9,454,758 | B2 | 9/2016 | Desai | |
| 9,773,107 | B2 | 9/2017 | White | |
| 9,787,681 | B2 | 10/2017 | Clancy, III | |
| 2014/0004832 | A1 | 1/2014 | Dabbiere | |
| 2014/0040979 | A1* | 2/2014 | Barton | H04L 63/20 |
| | | | | 726/1 |
| 2014/0053234 | A1* | 2/2014 | Barton | H04L 67/10 |
| | | | | 726/1 |

(Continued)

*Primary Examiner* — Khalil Naghdali
(74) *Attorney, Agent, or Firm* — Pepper Hamilton LLP

(57) ABSTRACT

A flexible policy system allows compliant apps on a mobile device to interact with a secure container memory space to ensure that data leak prevention policies are being enforced. Third-party applications can include an SDK or application wrapper that provide policy enforcement via agent functionality. An administrator can define policies via a web-based portal, allowing a server to identify appropriate users and devices and to distribute policies to those devices to be enforced within the secure container on each device. Policies can identify the datatypes and security levels, and the related applications and users that have authority to access that data. The agent or application wrapper enforces these policies on the mobile device before applications can access data in the secure memory space.

18 Claims, 5 Drawing Sheets

(56) References Cited

U.S. PATENT DOCUMENTS

2015/0082456 A1  3/2015  Eren

* cited by examiner

USE CASE DRIVEN GRANULAR APPLICATION AND BROWSER DATA LOSS PREVENTION CONTROLS

CROSS REFERENCE TO RELATED APPLICATION

This application is a continuation of U.S. patent application Ser. No. 14/808,671, filed on Jul. 24, 2015, which claims priority to U.S. Provisional Patent Application Ser. No. 62/028,864, filed on Jul. 25, 2014, each of which is incorporated herein by reference in its entirety.

TECHNOLOGY FIELD

The present invention relates generally to mobile device security, and more particularly to enforcing policies for data leak prevention within a secure memory space on a mobile device.

BACKGROUND

Businesses and organizations often use security applications to ensure the security and integrity of data used by users of the organization. In the context of mobile devices, there are a variety of vendors that provide mobile device management (MDM) applications that run on user mobile devices. However, as mobile device functionality rapidly evolves, and users adapt to using mobile devices in new ways, MDM vendors can struggle to keep up with demand for new functionality. Meanwhile, a large number of third parties offer applications that users desire to use.

While organization security policies have evolved to cater to user desire to use third-party applications on their mobile devices, it is difficult for these policies to ensure data security. Third-party applications may not be as secure as an organization would like. Accordingly, a common approach to this problem is to restrict sensitive data to within an MDM application on the device. However, this restrictive approach can limit the user's ability to use third-party applications with sensitive data. As a result, MDM vendors often must provide desirable functionality entirely within the application. Because applications and user preferences evolve, it can be difficult for an MDM vendor to keep up with demand for new functionality within its application.

Furthermore, not all data within an organization is necessarily sensitive. For example, certain documents within an organization may be of a public character, while other documents may be highly sensitive. Accordingly, restricting public documents available through the organization to the MDM application can be an unacceptably rigid approach to security.

Accordingly, there is a need for an MDM solution that allows a more intelligent approach to data security, allowing users to interact with third-party applications in a secure manner, allowing an organization to define security policies with the more flexibility with respect to the security of organization data.

SUMMARY

It is desirable to provide a flexible policy system, whereby compliant apps on a mobile device interact with a secure container or memory space on the mobile device to ensure that data leak prevention policies are being enforced. Third-party applications can include an SDK or application wrapper that provide policy enforcement via agent functionality. An administrator can define policies via a web-based portal, allowing a server to identify appropriate users and devices and to distribute policies to those devices to be enforced within the secure container on each device. Policies can identify the datatypes and security levels, and the related applications and users that have authority to access that data. This can allow data to be securely downloaded into a container on a device, and allow an administrator to dictate how that data may be used on the device, providing end-to-end data leak protection for data accessed on a mobile device.

According to one embodiment, a method for securing data on a mobile device includes receiving at the mobile device from a server, a policy assigned to the mobile device, where the policy defines available actions associated with at least one class of data to be accessed on the mobile device, and a document over a network. One of a plurality of applications on the mobile device requests access to data in the document. An agent operating on the processor of the mobile device determines based on the policy, whether the one of the plurality applications is authorized to access the data in the document, and grants access to the application.

In some instances, the application is compliant with an SDK that guarantees that the data in the document will be handled in accordance with the policy. The agent can be part of the SDK of the application. In some instances, noncompliant applications do not have access to the secure memory space of a container that stores the document once downloaded to the mobile device. In one aspect, the agent identifies a security level or a data type for the data being accessed. In one aspect, the agent identifies a file extension associated with the document for policy enforcement. In one aspect, identifying a data type for data includes identifying the data as being a phone number, an address, a number, or a URL.

According to another embodiment, a method for securing data includes defining a plurality of policies at a server, wherein each policy dictates which applications on a mobile device can access data in documents within a secure memory container on the mobile device, and identifying a plurality of mobile devices for which each of the plurality of policies should apply. The policies are distributed to the appropriate mobile devices via a network and an agent is provided to each of the mobile devices to enforce those policies. The agent is configured to automatically determine whether one of a plurality of applications on the mobile device is authorized to access data in a document in the secure memory container, in accordance with each policy. Exemplary agents may be provided via an SDK or application wrapper.

According to another embodiment a system for securing data includes a user interface on a server that facilitates the creation of a plurality of policies, where the server is configured to receive the plurality of policies and determine, for each policy, which of a plurality of mobile devices should enforce the policy, and further configured to distribute each policy to an appropriate subset of the plurality of mobile devices via a network. A software agent is configured to operate on each of the plurality of mobile devices, monitor operating system events, and automatically enforce each of the plurality of policies distributed to each mobile device. Each policy identifies one or more applications on a mobile device that are authorized to access data in documents within a secure memory container.

DETAILED DESCRIPTION OF ILLUSTRATIVE EMBODIMENTS

Figure 1:
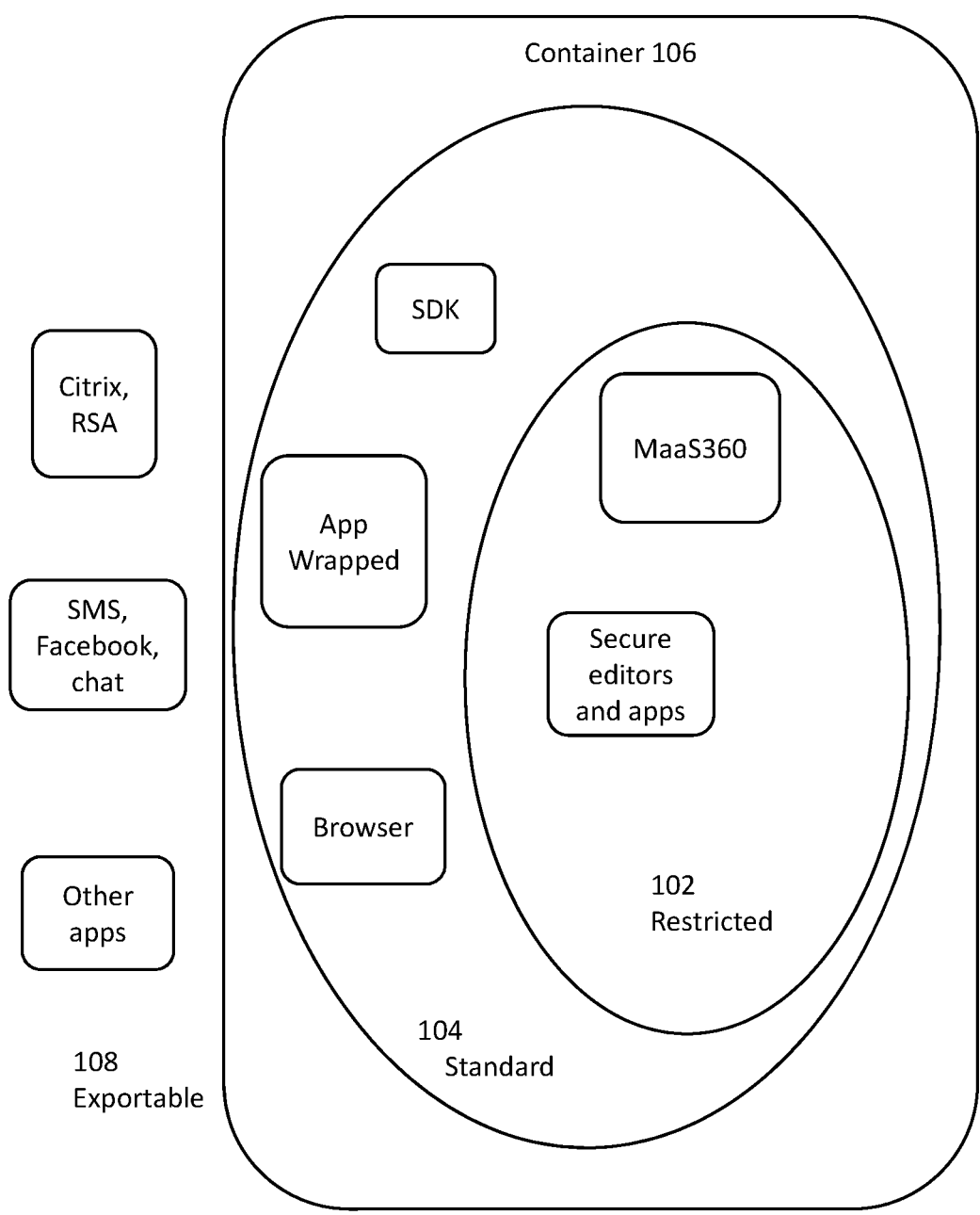
FIG. 1 is a logical diagram showing an exemplary relationship between a security level for data and applications within a secure container.

It is desired to enforce document and data restrictions across MDM vendor applications, company applications, and publicly available applications on a mobile device. Embodiments of the present invention can utilize a suite of applications for mobile devices that work together to protect a company information, while allowing less sensitive public or personal information to be treated differently. The secure container can include applications provided by an MDM vendor, as well as third-party applications that have been certified to work within the container. These third-party applications can be tailored for use within the DM secure container using an SDK provided by the MDM vendor. In some embodiments, these third-party applications are not altered from commonly available third-party applications, but are wrapped within a software module that provides the SDK functionality, restricting how the application shares information with the operating system or other applications. This application wrapper can act as an arbiter to ensure security compliance with otherwise unsecure third-party applications. Libraries embedded in third party applications or in the application wrapper used for third-party applications can ensure that use of those applications occurs within a virtual secure container.

Accordingly, a secure container can be a suite that includes a mixture of applications, such as the MaaS360 MDM application available from Fiberlink Corp., a browser application, and any third party applications that provide functionality that may be desirable to an organization or its users. Applications within the container should interact in accordance with a secure framework, such that passing of data and documents between and amongst applications within the container conform to a security policy of the organization. For example, if the MaaS360 application is aware that a PDF file should not be shared outside the container, it should pass that knowledge to the various applications within the container, such that they do not share that PDF file outside of the container. In this manner, a container on a mobile device can be thought of as a secure memory space on the mobile device. A secure container is a memory space whereby data is secured such that applications outside of the memory space cannot access this data. In some embodiments, data within the secure data space is encrypted in a data store accessible only to applications in the secure memory space/container.

Data loss prevention techniques have been used on desktop PCs, but have utilized constantly running, standalone applications/agents that act as a daemon to restrict how data moves through the operating system. Constantly running applications can be impractical on mobile devices, and it may be impractical to intercept printing calls and the like. Mobile devices are more suited to a secure container approach. Such an approach utilizes coding techniques and sandboxing via the operating system to restrict how applications share data. Such coding techniques and sandboxing techniques will be readily apparent to a person of ordinary skill in the art. The container approach allows an administrator or vendor to define how an application behaves and interacts with other applications.

Various applications have various degrees of security implemented within them. Users may have some control through their behavior to ensure security. Documents and data may each have different levels of security. For example, marketing materials may have different security concerns than an accounting sheet and need to be treated differently.

Given that different applications behave differently and that different documents may need to be treated differently, embodiments attempt to provide a uniform and extensible framework for ensuring compliance with flexible security policies when data is handled within the secure container. This allows an MDM solution to provide comparable levels of security to an MDM application when third-party applications are used. This allows users and organizations to have a wider selection of applications that can be used, without requiring an MDM vendor to develop all applications. Exemplary third-party applications that may be suitable for an application wrapper or by inclusion of an SDK within a secure container include common email, editing, viewing, and browsing applications, such as iAnnotate, Breezy, Box, Splashtop, GoodReader, etc. The application wrapper or SDK can guarantee that each third-party application can securely handle data in compliance with organizational rules.

By securing the applications within a container and including application components, such as an SDK or application wrapper, that ensure security compliance, certain benefits may be realized. For example a single sign on to an MDM application that governs compliance within the container can make the container easy to use. Because the MDM application can govern compliance within the container, traditional MDM policy approaches can be used, such as allowing a remote administrator to define policies for a group of users and edit these policies remotely. Encryption of data within the container can be assured, which can result in FIPS compliance. An administrator for the organization can utilize the MDM application in the remote compliance controls afforded to control data sharing between and amongst applications in the container. Data sharing controls can limit how data is exported to applications within the container, exported to applications outside the container, limit how data may be copied to a clipboard, and limit or block certain sharing functions of documents or data on a clipboard to applications that may be a security risk, such as Facebook, Twitter, printing programs, etc.

Whereas it may be trivial to ensure compliance within an MDM application provided by an MDM vendor, providing security controls to third party applications can be accomplished utilizing agent software provided by an SDK or application wrapper. Third parties can then use a toolkit provided by the MDM vendor, which allows third parties to plug in the SDK and join the secure container, exposing APIs that allow security controls in compliance with MDM rules. By providing an SDK, applications can be specifically developed to act within the container, which may allow greater functionality within the container. By providing an application wrapper, common third-party applications may not need to be modified in order to comply with the container rules. For example, applications from the Apple or Android apps store may be used by a user, but without the SDK these general-purpose applications may not be secure. By providing an SDK, applications can be tailored to the container; by providing an application wrapper, general applications can be wrapped by a the MDM vendor or the organization so that certain common applications can still be used, with the wrapper ensuring that data does not leak in violation of the MDM rules.

For example, the Breezy mobile printing application can allow a user to print to printers within an organization, but the application itself is an application widely available through public App Store. The developers of Breezy can implement the SDK provided by the MDM vendor so that their application can be certified to comply with the rules of the container. Alternatively, these developers may not choose to use the SDK, in which case, provided the application can be trusted, it can be wrapped an application wrapper, which limits the other applications it can share data with, as well as what data that may be received from other applications in the container. This allows an organization to authorize certain applications that may be widely available to function within the container, and apply the secure document management compliance tools to users, in the form of an application wrapper. Thus, an MDM vendor does not need to independently develop the same functionality as the Breezy application in order to satisfy user demand.

An SDK allows existing or developing third party applications to be modified so that they can interact with other applications within the secure container. In some embodiments, this SDK does not prevent these applications from continuing to work outside the container in situations where an MDM platform is not on the device. An advantage of an SDK is that when an MDM application is on the device, an application having that SDK can automatically behave in compliance with the secure container. In this manner, third parties may be encouraged to include the SDK in applications that are widely available on public app stores.

Embodiments provide a unified approach to a variety of applications where the level of trustworthiness of an application (as measured by its ability to be misused, for example) varies by application. Certain applications, such as Facebook or twitter, may simply be too unsecure by their nature to be used within a container. Meanwhile, applications such as an email client may be secure for dealing with certain types of email or certain types of documents, when complying with container rules and having an SDK or an application wrapper. For example, a web browser may be suitable for opening links from within a document, where the document is secure. The URL itself may not be secure information, thus an application container may identify URLs within a secure document has data that may be shared with the web browser in the container. A secure browser may be suitable for opening link that are internal to an organization. Compliance rules can be flexible, providing more liberal access to applications that store data in an encrypted manner or are FIPS compliant, while those noncompliant applications may be excluded from the container or their access limited to certain types of documents or data.

In some environments, it is desirable to allow an administrator to grant permissions to apps based on any of: their ability to accept files from other SDK apps; their ability to send files to other SDK apps; access to a common SDK-compliant clipboard; their ability to send email via secure mail; their ability to access user contacts or shared user sync storage; their access to an in-app VPN, whether provisioning of identities certificates for authentication. Thus, it may be helpful for the compliance rules or administrator defined rules to have an understanding of the security capabilities of each application in a container. This information can be published by the MDM vendor, and software rules within the MDM application can treat to these applications based on these capabilities, in compliance with MDM rules defined by an administrator or the MDM vendor.

For example, if an application is not certified by the MDM vendor, but a user wishes to use it, rules within the container may limit what data that application has access to. Similarly, certain applications may be certified for one purpose only. For example, and RSA application may be certified for accessing and RSA token, but not accessing a larger document. A web browser may be certified for receiving an external URL from within a document, but not for receiving other content that may be copied and pasted from that document, which may prevent a user from leaking data via a web-based email client. Thus, each individual application can be locked down to prevent it from leaking sensitive company data.

Data loss prevention controls can be provided to provide a flexible compliance approach to data within a secure container. For example, data security requirements for each organization will vary. Different groups within an organization may also have different security requirements. For example, the finance department may have different restrictions then the board of directors, customer service, or sales department. Meanwhile, different types of documents may have different security needs. For example, payroll, board of director minutes, engineering documents, source code etc. may need to be treated in a very secure manner. Sales presentations, planning documents, public documents, etc. may not need the same level of security. In some embodiments, data loss prevention controls should be able to provide flexible approaches that allowed administrator to treat users, groups, and different types of documents differently, to allow an organization to define an approach to security that meet its needs and satisfies users within the organization.

While users may be easy to define, there is a need to identify the security level of documents to allow rules to be defined as to how these documents may be handled within the container. Some embodiments may define levels of security that can be associated with documents or data. The matter of association can include any of those discussed herein. In some embodiments, three levels of security are used: restricted, standard, and exportable. Each of these may be identified by the file extension of a file, a data detector, or the source of the document. A data detector can be software that looks for patterns in data to identify data within a document as a certain type of data. For example, an address may appear in a document and a data detector can identify the pattern of text for that address as address data. This address data may then be used by a map application, via the clipboard. By limiting the data that goes to the map application to addresses, unknown security risks with that application may be mitigated. The source of a document can also be a useful indicator of the security level of document. For example, a document that is downloaded from a corporations secured data share can be presumed to be highly sensitive, while personal data from the mobile device can be viewed as fully exportable. Similarly, the application used to create of the data they also indicate the preferred security level for the document by default. In this indication can be via metadata or by file type.

The first level of security for data, restricted, is the highest level of security, in some embodiments. For restricted data, an administrator may need to define a white list of applications for each type of restricted data. For example, a word document determined to be of a restricted character may be limited to secure email and secure text editing applications within the container. Restricted data may be limited in whom it may be emailed to, such as limiting it to recipients that are within the organization. A security rule within the container can define that restricted data may only be emailed within the organization; a secure email application within the container can include a module from the SDK that enforces this rule, limiting the address field for emails forwarding this data to addresses within the organization. Restricted data may also be limited in how it may be used by the clipboard in the container, such as preventing it from being or printed. In some embodiments, secure restricted data can be controlled by requiring the user check out and check in the data when opening it with an application on a mobile device. Thus, only certified applications can access the document and any data leaks can be accounted for.

Second level of security for data, standard, can be a default level of protection for data. In some embodiments, standard data can be freely used by any application within the container, without additional restriction. Thus, any application in the container can access any data secured in the container, without restrictions due to granular rules.

A third level of security, exportable, is the lowest level of security. Exportable data can be freely used within the container and the clipboard, and may be accessed by any application on the device once the user has logged into the container to access the data. Exemplary actions can include using the clipboard to data from one document to another application, printing, sharing via a native email client or Facebook, etc.

FIG. 1 shows an example of how different security levels of data might be used by an organization on a mobile device. Restricted data 102 may be limited to certain highly secure applications within a container, such as those provided by an MDM vendor. For example restricted data may be limited to the MDM application, secure editors, or other secure apps that the organization can be confident do not leak data from the container. Standard data 104 is lower security, but rules may limit data to be used within the secure container 106. For example, standard data may only be accessed by applications that have been certified for compliance by inclusion of an SDK or application wrapper to ensure that these applications work within the container 106. Similarly, less secure applications within the container, such as a browser may be suitable for use with standard security data. Exportable data 108 is not limited to container 106, and can be freely used by applications outside the container. In some of violence, data loss prevention controls allow identifying a subset of applications on the device that are not part of the container that may be used to access as exportable data. For example, RSA tokens or Citrix links found within standard or restricted files may be suitable for use with non-container applications, such as an RSA client or a Citrix client. These datatypes may be considered exportable because they are not limited to the container, but their use may be limited to certain applications. Other exportable data may be freely shared by communication clients such as SMS, Facebook, chat applications, or any other applications.

An organization can assign security levels to files based on several approaches. For example, the type of content can be determined from a file type, metadata, data type identifier, or explicit assignment, which may be recorded in a database or in metadata for the file. Policies can then be used to control how each of the different datatypes are treated, for example Excel files may be identified as standard security level, restricting them to be used within the container. PDFs may be similarly treated, while photos or images may be considered exportable. If a photo is of a sensitive nature, metadata can be provided by the organization when uploading the photo to a file share that indicates the secure nature of that photo. This manner, manual or semiautomatic security level assignment can also be used.

The source of a document, such as a file share or document folder can be used to identify the security level file. For example certain portion of the file share may include secure documents, such that any documents downloaded from that portion of the file share are labeled as restricted. Similarly, certain folders in the file system of the mobile device can be identified as restricted, standard, or exportable. A mapping of these folders can be provided by the operating system of the mobile device or by the MDM platform within the secure container. Similarly, if a document was received via corporate email, this document may be given a default standard security level, restricting its use to the container.

Rules and data type identifiers can also be used to identify security level of data. For example, the file extension of a file can be defined in a rule to map to security levels. For example, .docx, .xls, and .pdf may be assigned a default security level of standard or restricted depending on the level of security desired for his file types. Furthermore, rules may be complex, allowing a combination of file type and data source to be used to assign security data type. For example, when these files are received via corporate email or downloaded from a secure file share, these file extensions may trigger a rule that identify files so downloaded as restricted.

Similarly, a data type detectors running in the container, managed by the MDM app can search files for certain data. For example, if the word "confidential" appears in the header of a word document, a data type detector can flag that document has restricted or standard. A data type detector can be logic that scans a file for certain types of information. In some embodiments, data detectors are provided by the SDK or application wrapper, such that when a file is opened by an application in the container, the data type detector can prevent the file for opening. In some embodiments, data detectors as part of the SDK or application wrapper for apps in the container can search the content of a file once that file has been opened. In some embodiments, the data detector may be provided by an MDM application within the container, allowing SDK enabled apps to invoke the data detector via procedure calls to the MDM application. Initially, when a document is opened, the SDK or application wrapper can restricted that document to only the container application, data detectors can then run detection to identify different actions that are available based on the content of the data within the file.

For example, a file within a secure editor in the container can look for text strings that appear to be candidates for phone numbers, addresses, tracking numbers, credit card numbers, Social Security numbers, etc. Addresses and phone numbers maybe suitable for opening in unsecure apps, allowing this portion of the document to be identified as exportable data. This may allow a user to click on a phone number and export that phone number to the phone app on the mobile device, allowing the user to make a phone call. Meanwhile, credit card numbers or Social Security numbers may be identified as highly sensitive. Thus, a data type detector running in an app that is accessing a standard level document may flag these particular pieces of the document as restricted, preventing them from being copied and pasted into other apps. Similarly, data type detector can identify URLs, allowing such data to be exported to a web browser. If a URL is an internal URL, that URL may be opened by a secure browser in the container, allowing it to access internal resources to an organization via a VPN. In some embodiments, data type detectors look at metadata for a file to identify information in the metadata that directly indicates the security type or may be used by a rule to define the security type. For example, if metadata indicates the source folder of the file to be a secure folder, a rule may identify that folder as restricted, and therefore identify the file as restricted. In some embodiments, metadata for particular file types can include specific metadata that applies to identifying a security type, such as identifying and expiration date, whether the file is shareable, confidential, etc.

In some embodiments, the MDM application in a secure container can identify the source of a file, because the MDM application provides access to file shares. For example, user wishing to access a corporate file share may use the MDM application to access those files and download them to the mobile device. In doing so, the MDM application can add metadata to the file or otherwise flag the file, such as in a registry of files stored in the container. In some embodiments, applications within the container are responsible for tagging security levels for each file. This can be done by general policies or by data type detectors when the file is accessed or closed. Rules can be defined by the MDM application for controlling how files are flagged and datatypes are detected.

Rules can be applied in addition to any server-side or document-level (e.g., read write) permissions that may be in place for example, if the user is authorized to access certain folders in a data share administrator at that organization can define rules that identify which folders the user may access and identify the actions that may be taken on these files on a mobile device. This information can then be included in metadata of the file or sent to the MDM application operating in the secure container on the mobile device. Rules can then restrict the user from opening those files in certain applications or from moving those files out of certain folders within the secure container. In this manner, different security rules may apply to documents on mobile devices than to documents opened on other devices, such as desktops within the organization.

Rules can provide data controls based on the security type of the data, as well as other information about the data. Data controls can define the apps in which a document is allowed to open, the allowed domains to which a document may be emailed, whether cut/paste/print/save actions are supported, whether a document or data is editable, whether the document or data is shareable, and expiration date and time of data, if applicable. These data controls can also be explicitly defined in metadata or a database managed by the MDM application in the container.

The following are exemplary use cases. .ICA files can be marked as exportable to a Citrix receiver application, regardless of whether that application is in the container. .ICA files are suitable for opening in Citrix and may not present a large security risk when opened. A data detector that detects addresses can designate these as exportable via cut and paste. This can allow addresses found in a document to be copied into a map application on the mobile device. A board of director's word document pushed via a document management system can be marked as expiring in a certain timeframe, but may be freely shared amongst applications in the container in the meantime. PowerPoint documents may be designated as not shareable to non-container applications or to email addresses at external domains. This can restrict sensitive internal discussion from becoming public. URLs identifying RSA.com can be sent to the RSA secure ID app for soft token configuration.

Figure 2:
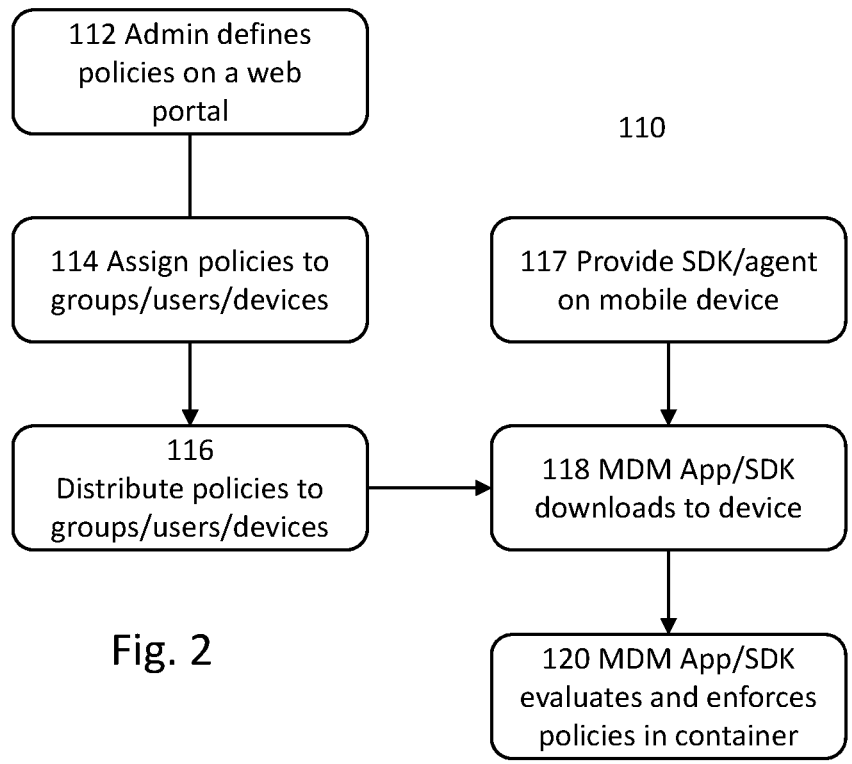
FIG. 2 is a flow chart illustrating an exemplary method for defining and enforcing data loss prevention controls on mobile devices, in accordance with some embodiments.

FIG. 2 is a flow chart of process 110 that is used to define and enforce policies for data loss prevention on mobile devices. An organization is able to define policies using a web-based portal, which may be provided by an MDM vendor. At step 112, an administrator from the organization defines policies for data loss prevention using this web portal. These policies identify one or more applications on a mobile device that are authorized each type of data that is subject to the policy. For example, a policy may define which applications may access a Word document, a PDF, address information, RSA tokens, etc. The web portal presents a browser-based user interface for an administrator to select these data types, security levels of data, and corresponding applications that may access this data to define new policies or update existing policies. A server then, at step 114, assigns policies to groups of users, individual users, or individual devices within the organization. This allows an organization to define different policies for different users. For example, the CEO may have different policies than a low-level worker in an organization. The server is responsible for identifying the appropriate devices on which these policies should be applied. At step 116 the server distributes the policies to the devices of the identified users or groups of users in an organization.

The portal allows an administrator to define policies around a number of different factors. Factors include the restrictions on data use, whether the administrator wants controls on a copying and pasting within a file, whether to control exporting the files out of the container, whether URLs should be handled differently from other data, etc.

At step 117, a software agent is provided to a mobile device as part of the secure container. This agent is generally software that is responsible for enforcing the policies defined via the web portal. This agent can be part of the application wrapper or SDK that allows third parties to participate in the container, while some agent functionality, such as data detectors can be supplemented as part of the MDM application in the container. The SDK or application wrapper participating in data leak prevention policy enforcement may refer to the SDK acting as an agent for the enforcement. Step 117 may be accomplished via any conventional distribution means, such as an app store, user downloads, preinstallation on the device, etc.

At step 118, an MDM application or other apps enabled with the SDK downloads the policies from the server. In some embodiments, the server maps policies to devices and notifies these devices to download a policy update, at step 116. This allows devices to be updated on-the-fly, allowing administrators to define policies at step 112 at any time. Once policies have been downloaded to the device, at step 120, the MDM application or container evaluates and enforces these policies within the container, as described throughout. These steps of method 110 on the left-hand side occur in the cloud or on a server, while the steps on the right occur on a user's mobile device.

Figure 3:
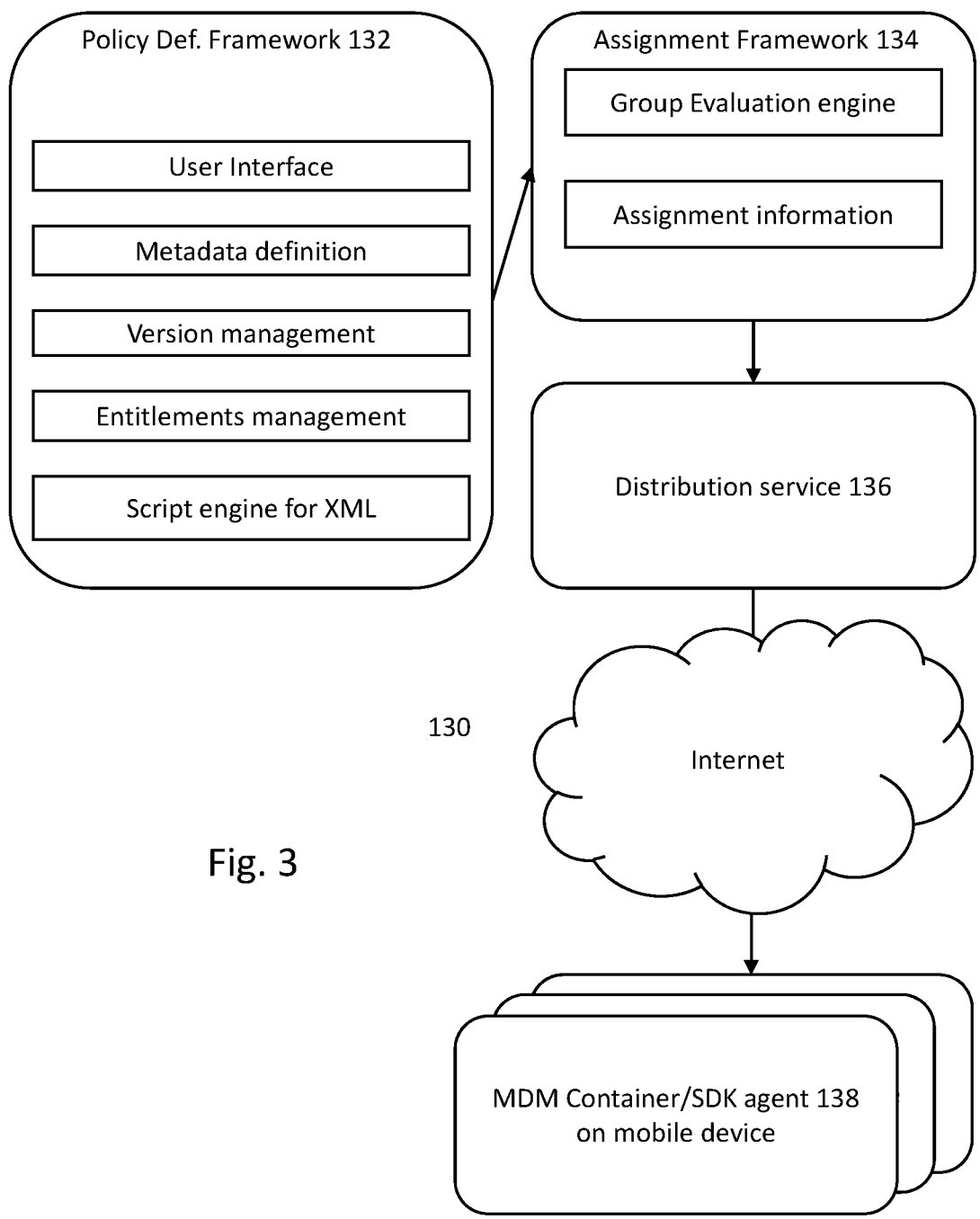
FIG. 3 is a system diagram illustrating exemplary server and mobile device modules for carrying out data loss prevention policies, in accordance with some embodiments.

FIG. 3 shows an exemplary system 130 for defining, distributing, and enforcing data loss prevention policies on mobile devices. Together, the modules system 130 carries out the steps of method 110 in FIG. 2. A policy definition framework 132 is a cloud-based server module that manages policies and allows an administrator to define these policies via the web portal. Exemplary modules that are part of policy definition framework module 132 include a user interface that presents a web-based screen to allow an administrator to define policies; a metadata definition module, which defines a be available user-defined metadata to enumerate the rules in a policy; a version management engine, that allows multiple versions of policies to be stored and maintained; an entitlements management engine that assists in defining the category of users to which each policy applies and for defining how each user can use each type of data defined a policy based on the administrator input; and a scripting engine that facilitates defining policies in executable XML scripts that can be interpreted by the SDK container components on mobile devices. Assignment framework 134 is a server-based module that facilitates the assignment of the individual policies defined by policy definition framework module 132 to individual users and devices. Assignment module 134 can include submodules, such as a group evaluation engine that assists in evaluating the entitlements of a policy to define the individual group of users to which the policy applies, and assignment information, which may be stored in a database, which maps the results of the group evaluation to individual devices or users. The assignment information can also include default assignments, user and user group definitions, device assignments, and group assignments. In this manner, the assignment of policies to initial devices can be a flexible process.

Distribution service 136 is a server-based system that facilitates distributing individual policies to individual devices. Distribution service 136 can be extensible, allowing it to facilitate distribution to a wide range of types of devices and operating systems. Logic in distribution service 136 can carry out the necessary steps to push policies out to individual devices, including working with iOS servers, blackberry servers, cloud distribution services, etc. Distribution services 136 contacts the MDM applications on individual devices, allowing these MDM applications to download the appropriate policies. This can be a pushing or a polling operation, depending on the desired implementation, and can be accomplished through any conventional means. MDM containers/SDKs 138 on mobile devices download these policies over the Internet and implement the policies as explained throughout. The individual policies received by individual devices are in accordance with the assignment framework 134.

In some embodiments, a portion of the functionality of assignment framework 134 is carried out by the MDM containers/SDK 138 on the individual devices. For example, a more general policy may be distributed to these devices with branching logic depending on whether the portion of the policy relates to that device. In these embodiments, the server containing distribution service 136 can provide both a policy and information about various assignments to device users, allowing the device to determine which group or individual user applies to the container.

The MDM container and SDK agent 138 contains logic for enforcing policies, which can be embedded into the MDM application, and agent, or $3^{rd}$ party applications which participate in the container ecosystem on the device. Whether this component is provided by an application wrapper, an SDK, native functionality of applications provided by an MDM vendor, etc., this SDK agent component is responsible for the final evaluation of the assignment to ensure that policies have been properly assigned to the device the SDK is further responsible with enforcing policies to ensure entitlement enforcement to ensure that data is being used properly. The SDK is responsible for enforcing data loss prevention controls as defined in the policy to limit how applications share data, as described throughout.

Components 132, 134, 136 are all cloud or server-based, while SDK 138 resides on a user's mobile device. The term SDK in this context refers generally to the enforcement components within the container on the mobile device, which may include an application wrapper or native functionality of MDM vendor-provided apps.

Figure 4:
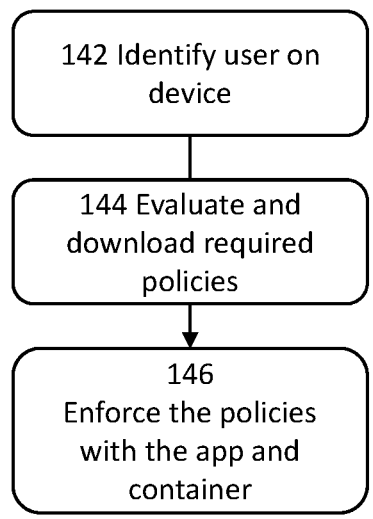
FIG. 4 is a flow chart illustrating an exemplary method for enforcing policies for data loss prevention on a mobile device, in accordance with some embodiments.

FIG. 4 shows an exemplary method 140 for the workflow of an SDK/secure container on a mobile device. At step 142, the SDK in the container on a mobile device identifies the current user of the device. Once the user is identified, at step 144, the SDK contacts the appropriate server and evaluates any rules to decide which policies should be downloaded at step 144. This evaluation can also include an evaluation of the time, location, ownership, or current context for the device. At step 146, the SDK enforces those policies within the app in the container. The SDK is tasked with enforcing these required policies within the application, which can include policies around how to save a document, what kind of encryption to use, what kind of restrictions are in place around someone trying to export a document outside an application, etc. For example, when someone clicks on a URL, policies may define that certain kinds of URLs go to a secure browser, or certain kinds of URLs get redirected to some completely different third-party application. This can include policies around what happens when someone tries to copy some content within the applications or any other policy discussed throughout.

The SDK can be used to apply security functionality to third party applications, as well. These applications can include applications that people obtain from a public or private application. The SDK can be used by all of these applications so that they have the option to access document repositories and receive documents from our application. Data can be pulled down or passed around through the SDK compliant application on the system. The settings and restrictions should apply as the data goes through a compliant application.

Figure 5:
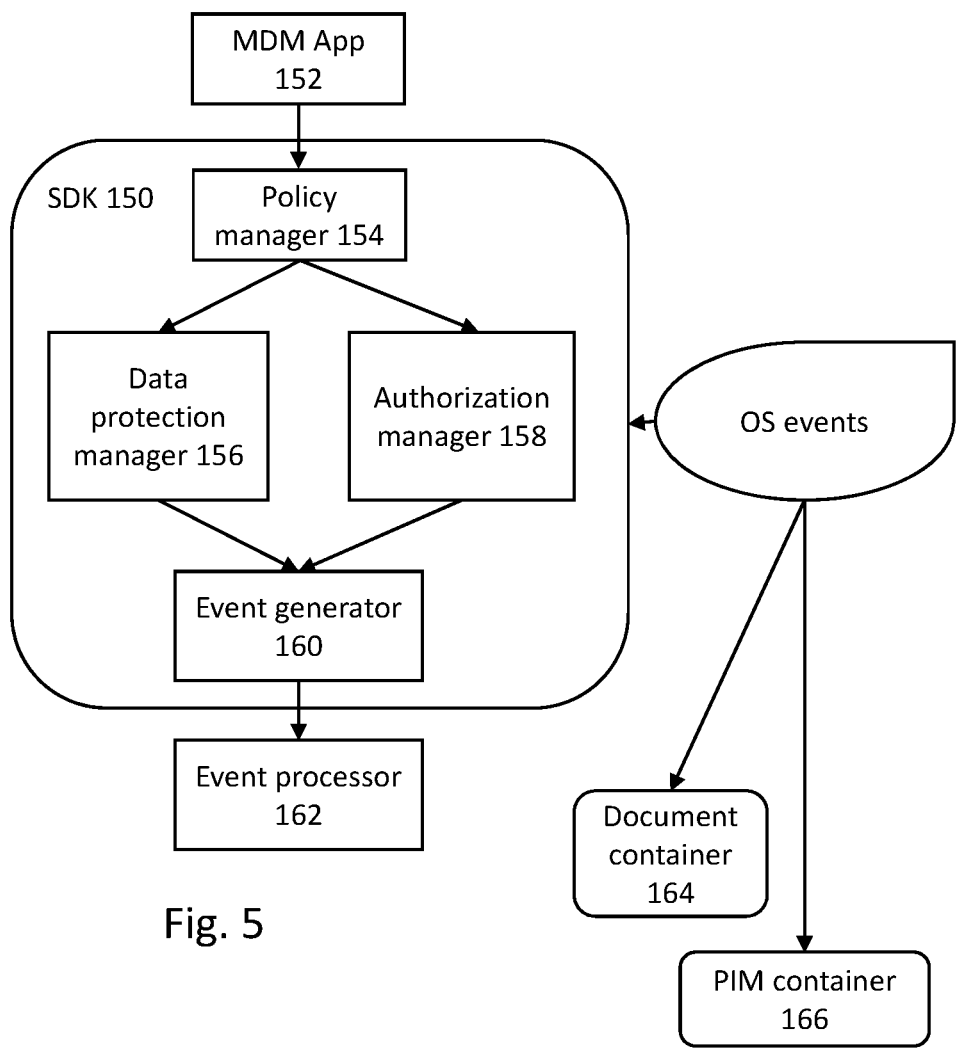
FIG. 5 is a system diagram for an exemplary SDK or agent on a mobile device, in accordance with some embodiments.

FIG. 5 shows an exemplary system 150 that can be used by the SDK within a secure container. SDK agent 150 is an example of an SDK module that can be part of a certified application that operates in the secure container. MDM app 152 can include server-side and mobile device components of the MDM framework provided by an MDM vendor. The MDM app is responsible for facilitating policy delivery to the SDK.

MDM app 152 works with policy manager 154 to ensure that the policies have been defined on the server are enforced. Policy manager 154 works with MDM app 152 to receive policies from the server and evaluated these policies to enforce them on the device. Policy manager 154 can directly contact the server to download policy details and updates and provide these updates to the SDK agent 150.

Policy enforcement is carried out by data protection manager 156 and authorization manager 158. Authorization manager 158 includes a policy listener that works with policy manager 154 to determine the user authorization requirements of a policy. Authorization manager 158 ensures that a user has proper authentication to access data or applications. The policy may identify the authentication requirements of the user, such as whether the user needs a password to get access to data or applications that are being controlled by the SDK. The credentials needed could be a simple code, a passcode, etc. Authorization manager 158 can determine when credentials expire and ensure that whenever someone is trying to access an application which is being managed by SDK, the authorization manager verifies user authorization. Authorization manager 158 controls how a user gets access to the applications in the container. Authorization manager 158 manages any event that would be used to authenticate the user and makes sure that the user has the authority to be accessing the document or application. To accomplish this, the SDK can access operating system events for use by the authorization manager.

Data protection manager 156 enforces data protection, which includes enforcing policies about what kind of documents are allowed to be exported, what kind of restrictions exist for copying, pasting, etc. within the container. Data protection manager 156 can enforce policies about restrictions and what happens with a URL. Data protection manager 156 obtains policies via a listener module to obtain policies from the policy manager 154. It should be noted that embodiments can include an interaction between data protection manager and authorization manager. Authorization manager 158 is responsible for ensuring that the user has rights to access the content and also helps pass on the user's embedded secure key or the password to data protection manager 156. Data protection manager 156 can use these credentials to encrypt all the secure data so that no one can access it without authorization or without complying with the policies received from MDM app 152. Data protection manager 156 can receive operating system events via the SDK to identify when a user has attempted to access certain data, allowing data protection manager 156 to enforce these policies.

Other modules can make sure that the required pieces are listening to the right events. For example, the authorization manager listens to any kind of events that relate to a user trying to use an application after some lockout or other interrupt. The lockout could be within some small time after a user last used it or after an hour of the last use. It is the authorization manager's responsibility to track those events and make sure that this particular use is happening while the user is still authorized. The authorization manager may need to ask the user for their password again or, if the event is in immediate succession, it can let the user use the application without asking for the password again. This is based on policies, such as user should be prevented to enter their PIN or password every minute, every 5 minutes, every hour, etc. The organization defines this in policies at the MDM portal on the serve. The authorization manager then enforces that policy. The data protection manager, on the other hand, listens to operating system events that relate to someone trying to take some information outside the ecosystem of applications. It could mean that someone is trying to open a file in another application or copy/paste some content or image or open a URL. All these are the kind of events which the data protection manager listens to and then applies policies, which are defined at the MDM portal.

The eventual output for some of these events is that the protection or authorization manager may generate another event that may require a certain action. For example, failed login attempts detected by the authorization manager may result in an action where all the business data needs to be wiped off, based on a certain policy. That would, in turn, generate an event via event generator 160, which is forwarded to the SDK event processor 162. Event generator 160 can generate events based on input from data protection manager 156 and authorization manager 158, as well as policies that define resulting actions. Event processor 162 can be part of the container, an application, or part of the SDK itself. Event processor 162 then takes the actions that the SDK may need to take to enforce a security policy. Exemplary events may include requesting that all data be encrypted and logged, alerting the user that he lacks authority to access the data in the manner he has requested, requesting all business data be removed until the user meets the compliance policies again, requesting that the whole application installation be cleaned up. In extreme cases a request can be made to the server to completely wipe the device.

Operating system events can also influence the behavior of a secure document container 164 or personal information manager container 166. The actual containers or applications may not be directly affected by the data protection manager events, but those events could indicate that there has been a breach in the device, and those events could then lead to wiping the device or any other security action that needs to be taken, according to a policy. The containers and applications are protected because of the policy manager and the authorization manager verifies that the user should have access to that information.

Figure 6:
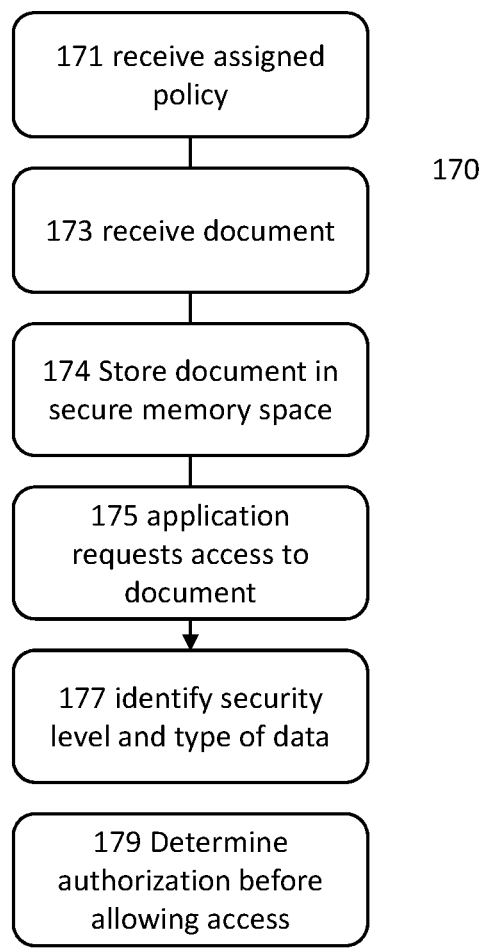
FIG. 6 is a flow chart illustrating an exemplary method for enforcing policies for data loss prevention on a mobile device, in accordance with some embodiments.

FIG. 6 shows an exemplary method 170 for securing data on a mobile device. At step 171, an agent, such as an MDM app or SDK component, receives an assigned policy from server. This process can involve a push of the policy from the server or downloading by the agent (e.g. directly, of via the MDM application that downloads and provides the policies to the agent) in response to a periodic timer to check for new policies or in response to a received alert of an updated policy. At step 173, the secure container receives a document, such as by downloading the document from a secure data store (e.g. through the MDM application) or receiving an email via a secure email client. At step 174, application the downloaded the document stores it in an encrypted data store for the secure memory space/container. This ensures that the document cannot be easily opened by user without authorization, including by applications outside of a container. At step 175, an application request access to the document. This can be driven by user action, such as a user attempting to open the document using an editor for that file type. At step 177, an agent, such as SDK components that are part of the app attempting to access the document, identify a security level for the document. The security level can be based on any of the number of concepts described herein, such as file type, file source, etc. At step 179, the agent determines whether the user is authorized to open the document using the application in response to the security level of the data, the policy associated with that data and security level, and the current conditions in the container, such as the authorized user, whether the document is expired, etc.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for securing data on a mobile device, comprising:
   receiving, at the mobile device from a server, a policy assigned to the mobile device, where the policy defines, for each of a plurality of security types of secured data stored in an encrypted datastore on the mobile device, which of a plurality of applications on the mobile device access the secured data;

requesting, by one of the plurality applications, access to requested data in a document stored in the encrypted datastore;

identifying, via a processor on the mobile device, a security type of the requested data in the document that includes a security level and a data type;

determining, via the processor, whether the requesting application is authorized to access the data in the document based on the policy, the requesting application, and the security type of the requested data; and providing selective access to the requested data by the requesting application.

2. The method of claim 1, wherein at least one of the plurality applications is compliant with a software development kit (SDK) that guarantees that the data in the document will be handled in accordance with the policy.

3. The method of claim 1, wherein determining whether the requesting application is authorized to access the data in the document comprises identifying a file extension of the document.

4. The method of claim 1, wherein determining whether the requesting application is authorized to access the data in the document comprises identifying whether the data is one of a phone number, an address, a number, and a URL.

5. The method of claim 1, further comprising downloading the document over a network to the mobile device by a downloading application that is one of the plurality of applications other than the requesting application.

6. The method of claim 1, wherein determining whether the requesting application is authorized to access the data in the document comprises identifying metadata stored with the document.

7. A method for securing data, comprising:

defining a plurality of policies at a server, wherein each policy dictates for each of a plurality of security types of secured data stored in an encrypted datastore on a mobile device, which of a plurality of applications on the mobile device access the secured data;

identifying a plurality of mobile devices for which each of the plurality of policies should apply;

distributing the plurality of policies to each respective device of the plurality mobile devices via a network; and providing an agent on each of the plurality of mobile devices that enforces the policies, wherein the agent comprises a software application that configures a processor of each of the mobile devices to identify a security type of requested data in the document, requested by a requesting application of the plurality of applications on the mobile device, that includes a security level and a data type, determine whether the requesting application is authorized to access the data in the document based on the plurality of policies, the requesting application, and the security type of the requested data; and provide access to the requested data by the requesting application if that access complies with the plurality of policies.

8. The method of claim 7, wherein the requesting application is compliant with a software development kit (SDK) that guarantees that the data will be handled in accordance with each policy.

9. The method of claim 7, wherein the agent is configured to identify a file extension associated with the document.

10. The method of claim 7, wherein the agent is configured to identify whether the data is one of a phone number, an address, a number, and a URL.

11. The method of claim 7, further comprising downloading the document over a network to the mobile device by a downloading application that is one of the plurality of applications other than the requesting application.

12. The method of claim 7, wherein the agent is configured to identify the security level of the requested data from metadata stored with the document.

13. A system for securing data, comprising:

a user interface on a server that facilitates user creation of a plurality of policies, wherein each policy dictates for each of a plurality of security types of secured data stored in an encrypted datastore on a mobile device, which of a plurality of applications on the mobile device access the secured data;

a hardware server configured to receive the plurality of policies and determine, for each policy, which of a plurality of mobile devices should enforce the policy, and further configured to distribute each policy to a respective subset of the plurality of mobile devices via a network;

a software agent comprising a software application that is configured to operate on each of the plurality of mobile devices that monitors operating system events and automatically enforces each of the plurality of policies distributed to each mobile device to selectively grant access by a requesting application on the mobile device to secured data in documents stored in the encrypted data store of the mobile device in accordance with the plurality of policies, by identifying a security type of the requested secured data that includes a security level and data type.

14. The system of claim 13, wherein the requesting application is compliant with a software development kit (SDK) that guarantees that the data will be handled in accordance with each policy.

15. The system of claim 13, wherein the software agent is further configured to identify a file extension associated with the documents.

16. The system of claim 13, wherein the software agent is further configured to identify whether the data is one of a phone number, an address, a number, and a URL.

17. The method of claim 13, further comprising downloading the document over a network to the mobile device by a downloading application on the mobile device other than the requesting application.

18. The method of claim 13, wherein the software agent is configured to identify the security level of the requested data from metadata stored with the document.

* * * * *